UNITED STATES PATENT OFFICE.

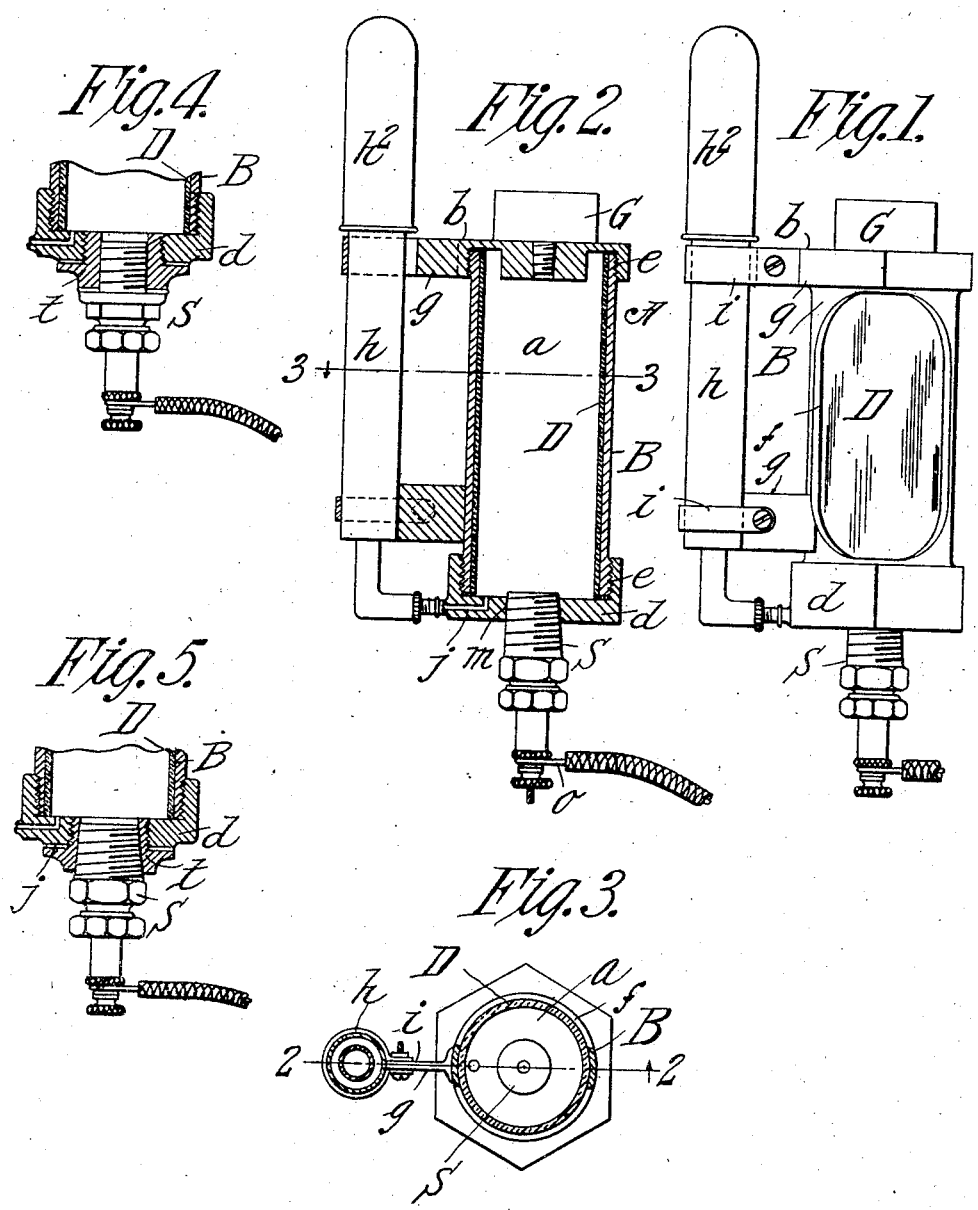

JOSEPH VALOIS, ALPHONSE GROISE, AND ARMAND GROISE, OF HOLYOKE, MASSACHUSETTS.

SPARK-PLUG TESTER.

1,033,498.

Specification of Letters Patent.   Patented July 23, 1912.

Application filed February 9, 1912.   Serial No. 676,523.

*To all whom it may concern:*

Be it known that we, JOSEPH VALOIS, a British subject, and ALPHONSE GROISE and ARMAND GROISE, French subjects, and residents of Holyoke, in the county of Hampden and State of Massachusetts, have invented certain new and useful Improvements in Spark-Plug Testers, of which the following is a full, clear, and exact description.

This invention relates to a device primarily designed as an implement to be carried in the tool kit of an automobile for testing spark plugs preparatory to screwing them into place in the cylinder.

The ordinary manner of testing a spark plug is to attach the spark circuit wire of an automobile to the plug when the same is removed from the cylinder, and in the atmospheric air under conditions for the sending of the current through the plug observing whether or not the same sparks. This is not always an effectual test, as a spark plug which may emit a spark while in the atmospheric air will not be effective as a spark producer when tightly in place in its connection with the cylinder and subjected to the compression of the gas as performed in the actual and practical usage of the same.

This invention, therefore, is to provide a means by which the spark plug, at the time the current is sent through it, is subjected to the same conditions of fluid compression as when actually in use in the cylinder of an engine, the same being so made with a window or transparent portion in its wall that it may be discerned whether or not under the establishment of the current the plug is sparking.

The invention contemplates the provision of an inclosed chamber having a transparent wall and provided in a portion of its inclosing wall, which is preferably of metal, with an aperture adapted to receive connection therein of the shank of a spark plug, and means such as an air compressing pump for establishing a compression of air in the inclosed chamber approximately the same as that established in the cylinder of the gasolene engine; and the device, moreover, is equipped with a gage for determining the amount of the pressure of the air established within the chamber to which the spark plug is subjected.

The device is described in conjunction with the accompanying drawings in which:—

Figure 1 is a side elevation of the spark plug testing device; Fig. 2 is a central vertical sectional view through the same, the air compressing pump of common form being represented in side elevation. Fig. 3 is a horizontal cross sectional view on line 3—3, Fig. 2. Figs. 4 and 5 are sectional views of the lower portion of the device showing the same adapted for the reception therein of interchangeable bushings for different standard kinds of spark plugs.

Similar characters of reference indicate corresponding parts in all of the views.

In the drawings, A represents the hollow body of the device constructed to provide the inclosed air chamber $a$ therein. This body is made with upper and lower metallic heads $b$ and $d$ having circularly threaded sockets $e$ therein; and B represents a skeletonized metallic tube formed with window-like openings $f$ at its side or opposite sides and having its circular end portions externally screw threaded for engagements in the aforementioned sockets $e$ of the heads $b$ and $d$. And the heads united and held together by the said skeletonized tube E also confine between them the glass tube D of comparatively large diameter, suitable packing being provided between the ends of the glass tube and the bases of the sockets $e$.

The frame or body of the device has transversely extending bracket lugs $g$ $g$ which support the cylinder $h$ of a hand air compressing pump, the same being connected by clips $i$ or in any practical manner.

$h^2$ represents the movable operating member of the pump and to which the pump piston is attached. The pump has connection at its lower end through the passage $j$ into the chamber $a$, and the degree of the air pressure established in the air chamber may be determined by the pressure gage G which is connected at the top of the body of the device.

S represents a spark plug screwed into the threaded aperture $m$ in the lower head $d$; and $o$ represents the spark circuit wire connected with the spark plug.

In the employment of the device, the plug being inserted in its place as shown, and the wire $o$ connected, the pump is operated by hand to establish a pressure say from 50 to 75 pounds in the chamber $a$, approximately corresponding to the gas compression in the engine cylinder, and then the metallic body of the tester may be laid upon or brought to contact with the engine body so that the conductivity of the current may be completed; and then by looking through the transparent or window-like part of the body it may be perceived whether or not there is a sparking of the plug.

In order to adapt the apparatus for the testing of spark plugs of different standards, we provide interchangeable annular bushings $t$ for screw threading engagements in the lower head $d$, as represented in Figs. 4 and 5. And the tool or apparatus is commercially to be sold with a set of these interchangeable bushings for the manifest completion of the equipment.

We claim:—

In a spark plug tester, upper and lower metallic heads having threaded sockets therein, a tubular member formed with apertures therein endwise screw engaged in the sockets of the heads, a glass tube within the tubular apertured member and extending from one to the other of the bases of said sockets in the opposite heads,—said heads having laterally extending bracket lugs, and an air compressing pump supported by said bracket lugs and having connection with the passage through one of said members which leads into the glass tube inclosing chamber, and one of said members having an aperture for receiving connection therein of the shank of a spark plug.

Signed by us at Springfield, Mass., in presence of two subscribing witnesses.

JOSEPH VALOIS.
ALPHONSE GROISE.
ARMAND GROISE.

Witnesses:
  WM. S. BELLOWS,
  G. R. DRISCOLL.